Patented June 10, 1947

2,422,016

UNITED STATES PATENT OFFICE 2,422,016

PROCESS FOR PREPARING ACETONE AND ACETATE ESTERS

David C. Hull, Oak Ridge, and Albert H. Agett, Kingsport, Tenn., assignors to Eastman Kodak Company, Rochester, N. Y., a corporation of New Jersey No Drawing. Application December 12, 1945, Serial No. 634,630

5 Claims. (Cl. 260—479)

This invention relates to a method of making esters and acetone in which isopropenyl acetate is reacted with an alcohol or a phenol in the presence of a small proportion of catalyst.

Esters of hydroxy compounds, such as alcohols or phenols, are ordinarily prepared by using acetic acid, acetic anhydride, acetyl chloride, or corresponding compounds. When esterification is conducted using acetic acid, acetic anhydride, or acetyl chloride, the by-products of the reactions are water, acetic acid, and hydrochloric acid, respectively. Not only are the by-products of these esterifying agents of minor value as compared with the by-products obtained by our invention, but in addition those compounds are sometimes disagreeable to handle and give reactions which do not go too smoothly.

One object of our invention is to provide a process for esterifying alcohols or phenols using isopropenyl acetate. Another object of our invention is to provide an esterification process in which acetone is obtained as the by-product. A further object of our invention is to provide an esterification process using an esterifying agent which is more agreeable to handle than those normally employed and also which gives a smoother esterification reaction than is often obtained with those previously employed esterifying agents.

Our invention is ordinarily carried out by mixing together isopropenyl acetate and the hydroxyl compound to be esterified and subjecting the mixture to an increasing temperature. Ordinarily, it is most satisfactory to carry the reaction out in a distillation apparatus in which case the products are easily drawn off as they form at the temperatures present. For instance, with the esterification of butyl alcohol as the temperature is increased, acetone comes off first, and several degrees higher the appearance of butyl acetate is noted. Because of the fact that acetone and the higher esters may be separated in this manner, our process is especially useful in preparing the esters of the butyl and amyl alcohols. Nevertheless, it is adapted to the preparation of the esters of the various alcohols of which it is desirable to form esters.

Our process is particularly desirable for esterifying the alcohols of 1–5 carbon atoms and may be employed to esterify either the primary, secondary, or tertiary alcohols within this range and may be employed to esterify polyhydroxy alcohols as well as monohydroxy alcohols. Some of the alcohols which may be esterified in accordance with our invention are normal butyl alcohol, isopropyl alcohol, ethyl alcohol, tertiary amyl alcohol, secondary butyl alcohol, or in fact, any of the mono-hydroxy alcohols having a 1–5 carbon atom content. Our process is also adapted to the esterification of polyhydroxy alcohols, such as ethylene glycol, propylene glycol, or the like, or the glycerols, such as glycerine or its substituted products. Of the phenols our process may be employed to esterify either ordinary phenol or the substituted phenols, such as the cresols or other substituted compounds of this type. The final products in all of these various cases are the acetates of the hydroxy compounds employed and acetone.

The reaction as described herein is carried out in the presence of a catalyst which need be present only in a very small proportion. For instance, with sulfuric acid, the amount of sulfuric acid may be from 0.1% down to .01% based on the weight of the isopropenyl acetate to get good acetalization. The amount of the catalyst employed, however, is not critical, and ordinarily merely the adding of a little sulfuric acid to the mass is satisfactory for the promotion of the reaction without any necessity of measuring the amount of catalyst to add. Other catalytic materials have been found to be satisfactory for use instead of, or in addition to sulfuric acid in our process. Other catalysts which are suitable are benzene sulfonic acid, boron trifluoride, sodium acetate, zinc chloride, phosphoric acid, sulfo-acetic acid, or a mixture of sulfuric acid and phosphoric acid. Instead of carrying out the reaction in a batch-wise manner, if desired, a continuous procedure may be employed such as passing a mixture of the reacting liquids through a heated tube or countercurrently to hot gases in a packed column. The preferred method of operation of our process is a matter of choice of the individual operator.

The following examples illustrate our invention:

*Example 1.*—102 g. of isopropenyl acetate were mixed with 78 g. of butyl alcohol, and 2 drops of concentrated sulfuric acid were added thereto. The mixture was subjected to distillation using a fractionating column under atmospheric pressure. 52 g. of acetone were obtained at 55–77° C. As the temperature went up the scale butyl acetate was obtained within the range of 116–125° C., the major portion of the butyl acetate distilling off at 122–125° C. An 85% conversion of butyl alcohol to butyl acetate was obtained.

*Example 2.*—A mixture was prepared of 100 g. of isopropenyl acetate, 60 g. of n-propyl alcohol and 3 drops of concentrated sulfuric acid. The mixture was heated using a fractionating column as described in the preceding example. 45.7 g. of acetone were obtained up to 60° C. At 96–100° C. 79.9 g. of propyl acetate-propyl alcohol mixture were removed. The residue of 30.2 g. had a large proportion of propyl acetate. A conversion of 80% of the propyl alcohol, yield of 95%, was obtained.

Example 3.—A mixture was formed of 100 g. of isopropenyl acetate, 74 g. of secondary butyl alcohol, and 3 drops of concentrated sulfuric acid. After refluxing, the mixture was fractionated at atmospheric pressure. 48.6 g. of acetone were recovered up to 58° C. Intermediate cuts were taken up to 105° C. consisting of mixtures of acetone and isopropenyl acetate. A cut taken at 105–110° C. analyzed 89% secondary butyl acetate. The residue analyzed 76% secondary butyl acetate. A 68% conversion of secondary butyl alcohol to secondary butyl acetate was obtained.

Example 4.—A mixture was formed consisting of 100 g. of isopropenyl acetate, 88 g. of tertiary amyl alcohol and 12 drops of sulfuric acid. The mixture was distilled at atmospheric pressure using a fractionating column. At 36–37° C. 60 g. of amylene were removed which represents an 87% conversion. At 45–58° C. 36 g. of acetone were removed. Unreacted isopropenyl acetate and acetic acid were removed up to 115° C. The remaining liquid contained 52.3% of acetic acid and 45.4% of tertiary amyl acetate. A 12% conversion of the alcohol to tertiary amyl acetate was obtained.

Example 5.—A mixture was prepared consisting of 200 g. of isopropenyl acetate, 60 g. of ethylene glycol and 5 drops of sulfuric acid. The mixture was distilled at atmospheric pressure using a fractionating column. A total of 86 g. of acetone was removed. The liquid was then distilled under reduced pressure and 91 g. of ethylene glycol diacetate were obtained. The conversion of the glycol to ethylene glycol diacetate was 62%.

Example 6.—100 g. of isopropenyl acetate were mixed with 30 g. of glycerin and 3 drops of sulfuric acid. Acetone was distilled off at atmospheric pressure, 57½ g. being recovered. The sulfuric acid present in the residual liquid was neutralized with magnesium carbonate and the mass was distilled at 2 mm. pressure. Glyceryl triacetate was distilled off at 113–115° C. A 100% conversion of glycerin to the triacetate was obtained.

Example 7.—A mixture was prepared consisting of 100 g. of isopropenyl acetate, 94 g. of phenol and 6 drops of sulfuric acid. Upon distillation 32.9 g. of acetone were recovered. The sulfuric acid present in the residual liquid was neutralized with magnesium carbonate and the material was distilled under reduced pressure. A total of 80.7 g. of phenyl acetate was obtained representing a conversion of 61%.

In esterifying hydroxy compounds in accordance with our invention it is desirable, if maximum conversion of the hydroxy compound is desired, that the isopropenyl acetate be employed in an amount at least chemically equivalent to the hydroxy compound. The use of an excess of isopropenyl acetate is not detrimental to the process and sometimes may even be desirable. The proportions illustrated in the examples were found very satisfactory for acetalizing the hydroxy compounds to a satisfactory extent.

We claim:

1. A method of preparing acetone and an alkyl acetate which comprises preparing a mixture of isopropenyl acetate, an alcohol of 1–5 carbon atoms, and a small proportion of an esterification catalyst and subjecting the mixture to an elevated temperature.

2. A method of preparing acetone and phenyl acetate which comprises mixing phenol, isopropenyl acetate, and a small proportion of an esterification catalyst and subjecting the mixture to an elevated temperature.

3. A method of preparing acetone and butyl acetate which comprises mixing butyl alcohol, isopropenyl acetate, and a small proportion of sulfuric acid and subjecting the mixture to an elevated temperature.

4. A method of preparing acetone and the ester of a hydroxy compound which comprises mixing a hydroxy compound selected from the group consisting of the alcohols and the phenols with isopropenyl acetate and a small proportion of esterification catalyst and subjecting the mass to an increased temperature.

5. A method of preparing acetone and an ester of a hydroxy compound which comprises mixing a hydroxy compound selected from the group consisting of the alcohols and the phenols with isopropenyl acetate and a small proportion of sulfuric acid and subjecting the mass to an increased temperature.

DAVID C. HULL.
ALBERT H. AGETT.

REFERENCES CITED

The following references are of record in the file of this patent:

FOREIGN PATENTS

| Number | Country | Date |
| --- | --- | --- |
| 314,646 | Great Britain | July 4, 1929 |

OTHER REFERENCES

Desha, "Organic Chemistry" (1936—McGraw-Hill), pp. 514. (Available in Div. 6.)